(12) United States Patent
Mendez

(10) Patent No.: US 11,841,085 B1
(45) Date of Patent: Dec. 12, 2023

(54) PISTON ACTUATED CARTRIDGE VALVE

(71) Applicant: Government of the United States, as represented by the Secretary of the Air Force, Wright-Patterson AFB, OH (US)

(72) Inventor: Edgar Mendez, California City, CA (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 17/573,676

(22) Filed: Jan. 12, 2022

Related U.S. Application Data

(60) Provisional application No. 63/148,185, filed on Feb. 11, 2021.

(51) Int. Cl.
 *F16K 11/18* (2006.01)
 *F16K 31/52* (2006.01)
 *F16K 11/16* (2006.01)

(52) U.S. Cl.
 CPC .............. *F16K 11/18* (2013.01); *F16K 11/16* (2013.01); *F16K 31/52* (2013.01); *Y10T 137/87877* (2015.04)

(58) Field of Classification Search
 CPC .... F16K 11/18; F16K 31/52; Y10T 137/7877; Y10T 137/87877
 See application file for complete search history.

(56) References Cited

U.S. PATENT DOCUMENTS

| 961,738 | A | | 6/1910 | Stickel | |
|---|---|---|---|---|---|
| 1,961,738 | A | | 6/1910 | Stickel | |
| 1,679,898 | A | | 8/1928 | Gilbert | |
| 2,170,478 | A | | 8/1939 | Long et al. | |
| 2,301,439 | A | * | 11/1942 | Moen | F16K 11/18 137/636.1 |
| 2,351,874 | A | | 6/1944 | Parker | |
| 2,373,654 | A | | 4/1945 | Beekley et al. | |
| 2,420,588 | A | | 5/1947 | Dunnihoo | |
| 2,499,318 | A | | 2/1950 | Jungerhans | |
| 2,525,313 | A | * | 10/1950 | Putnam | F16K 11/18 251/258 |
| 2,574,054 | A | | 11/1951 | Miller | |
| 2,641,437 | A | | 6/1953 | Jay et al. | |
| 2,710,023 | A | | 6/1955 | Blackford et al. | |
| 2,761,463 | A | | 9/1956 | Wagner | |
| 2,876,788 | A | | 3/1959 | Shube | |

(Continued)

OTHER PUBLICATIONS

U.S. Appl. No. 17/573,675, filed Jan. 12, 2022, Mendez.

*Primary Examiner* — Matthew W Jellett
*Assistant Examiner* — Christopher D Ballman
(74) *Attorney, Agent, or Firm* — AFMCLO/JAZ; Matthew D. Fair

(57) ABSTRACT

A piston actuated cartridge valve (PACV) can be formed within a fluid fitting such as a tee or cross member in a fluid piping system. The PACV includes a base mount extending between first and second ends having a stop and a slide positioned therein. The slide is movable between a closed position and a fully open position by an actuation piston and spring working in combination. The slide permits fluid flow therethrough in the open position and restricts fluid flow in the closed position.

18 Claims, 12 Drawing Sheets

(56) References Cited

U.S. PATENT DOCUMENTS

| | | | |
|---|---|---|---|
| 2,931,385 A * | 4/1960 | Carlisle | F16K 15/026 251/210 |
| 2,943,639 A | 7/1960 | Smith | |
| 3,053,500 A * | 9/1962 | Atkinson | F16K 1/38 251/332 |
| 3,181,790 A | 4/1965 | Smith | |
| 3,537,479 A * | 11/1970 | Nelson | F16K 11/18 137/597 |
| 3,565,100 A * | 2/1971 | Pfleger | F16K 15/026 251/333 |
| 3,749,122 A | 7/1973 | Gold | |
| 4,010,772 A * | 3/1977 | Palmer | F16K 19/00 251/172 |
| 4,148,338 A | 4/1979 | Skoli | |
| 4,183,376 A * | 1/1980 | Moen | F16K 11/18 251/318 |
| 4,291,719 A | 9/1981 | Lehmann | |
| 4,398,553 A | 8/1983 | Perrine | |
| 4,508,143 A * | 4/1985 | Ogasawara | F16L 55/07 222/448 |
| 4,739,798 A * | 4/1988 | Botnick | F16K 11/22 137/630.2 |
| 4,953,589 A * | 9/1990 | Nakamura | F02M 59/462 137/543.23 |
| 4,977,927 A | 12/1990 | Hill | |
| 5,033,503 A | 7/1991 | Horton et al. | |
| 5,095,944 A * | 3/1992 | Hochstrasser | F16K 31/3855 251/38 |
| 5,195,552 A | 3/1993 | Nehm | |
| 5,433,378 A * | 7/1995 | Orlandi | G05D 23/1353 236/12.22 |
| 6,152,171 A | 11/2000 | Messick et al. | |
| 6,474,363 B1 | 11/2002 | Stephenson | |
| 6,802,332 B1 | 10/2004 | Stuart | |
| 7,222,637 B2 * | 5/2007 | Miyajima | F16L 37/40 137/515 |
| 7,287,545 B2 | 10/2007 | Zelson | |
| 7,395,836 B2 | 7/2008 | Krebs et al. | |
| 7,434,593 B2 | 10/2008 | Noll et al. | |
| 7,559,530 B2 | 7/2009 | Korogi et al. | |
| 7,740,023 B2 | 6/2010 | Zweber | |
| 8,047,502 B2 | 11/2011 | Paffrath | |
| 8,205,641 B2 | 6/2012 | Richardson | |
| 8,281,806 B2 | 10/2012 | Seppmann | |
| 8,726,932 B2 * | 5/2014 | Matsubara | F16K 15/026 137/542 |
| 9,677,717 B2 | 6/2017 | Jenks | |
| 9,958,079 B2 | 5/2018 | Morris et al. | |
| 10,184,735 B2 | 1/2019 | Sheppard et al. | |
| 10,385,982 B2 | 8/2019 | Patterson et al. | |
| 10,428,963 B2 | 10/2019 | Barreda | |
| 10,533,674 B2 * | 1/2020 | Sierakowski-Larsen | F04D 15/0022 |
| 10,767,773 B2 * | 9/2020 | Lee | F16K 27/0209 |
| 11,353,117 B1 * | 6/2022 | Smith | F16K 15/06 |
| 11,421,679 B1 * | 8/2022 | Mullins | F16J 15/183 |
| 11,434,900 B1 * | 9/2022 | Alex | F04B 53/1027 |

* cited by examiner

PISTON ACTUATED CARTRIDGE VALVE

Pursuant to 37 C.F.R. § 1.78(a)(4), this application claims the benefit of and priority to prior filed Provisional Application Ser. No. 63/148,185, filed Feb. 11, 2021, which is expressly incorporated herein by reference.

RIGHTS OF THE GOVERNMENT

The invention described herein may be manufactured and used by or for the Government of the United States for all governmental purposes without the payment of any royalty.

TECHNICAL FIELD

The present disclosure generally relates to a piston actuated cartridge valve and a method for using the same.

BACKGROUND

Piping and fluid components are used in many different industries to contain and transfer fluid as part of a process or operation. In aerospace applications, fluids can be stored in tanks then transferred to consuming components such as turbine or liquid rocket engines. Some fluids must be vented to atmosphere to lower pressure in the piping circuits or tanks. Further, liquid transfer systems often require a bleed device to remove any trapped vapor in the system. These liquid transfer or process systems also require a purge system to provide inert contents during repair or removal of system components.

When examining complexity and application of components for aerospace applications such as rocket engines, the main propellant feed systems include fuel and oxidizer piping systems. Each of these main propellant systems has ancillary plumbing requirements to drain or purge the main propellant systems. These ancillary systems require sufficient reliability with minimal leakage when connected to main propellant feed systems which requires operation in a wide range of temperatures, pressures and flows.

Valves are used in fluid process systems to transfer fluids to or from main supply piping systems. Connecting valves to piping or tubing circuits require fittings with sealing surfaces. These sealing surfaces provide a contact area for the sealing material to provide a leak tight joint. The fittings are manufactured connection components having various flow paths and connection types such as tee's, elbow's, crosses, unions, etc. Fittings can be conventionally machined, forged, welded or additively manufactured and may use pipe flanges, tubing flares, threads, piping hubs or similar components to seal the joint.

Each connection requires labor to assemble and is a potential leak path. As the number of connections increase the potential for higher rework labor cost due to galling, stripping or damage to threaded or flange sealing surfaces increase. The weight of the system also increases proportionally to the number of connection joints employed therein. It is desirable to provide a reliable low cost light weight, leak free valve and plumbing assemblies for such systems, accordingly, there remains a need for further contributions in this area of technology.

SUMMARY

One embodiment of the present disclosure includes a unique valve device. Other embodiments include apparatuses, systems, devices, hardware, methods, and combinations wherein a piston actuated valve is defined within a fitting. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
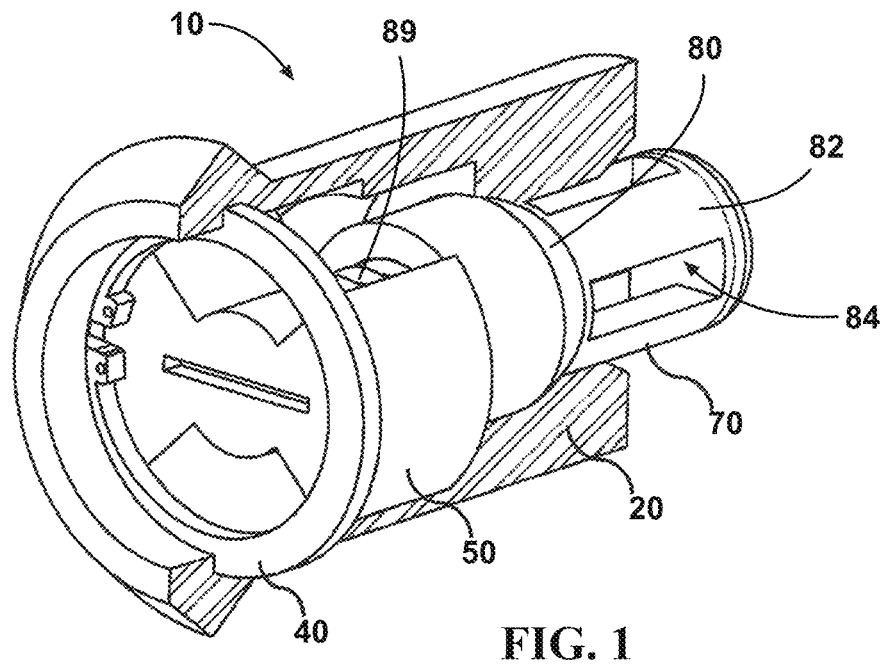
FIG. 1 is a perspective cut away view of a PACV assembly according to one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIG. 1, a perspective view of a piston actuated cartridge valve (PACV) 10 according to one embodiment of the present disclosure is depicted. The PACV 10 includes a base mount 20 to hold various operating components therein. A retaining clip 40 engages and locks a stop 50 into the base mount 20. A slide 70 is operable for controlling a fluid flow through the PACV 10. A spring 89 is positioned between the stop 50 and the slide 70. The spring 89 urges the slide 70 to move away from the stop 50 toward a normally closed position depending on the system requirements. In the depicted configuration, the spring 89 biases the slide 70 toward a closed position, however in other embodiments the spring 89 may be configured to bias the slide 70 toward an open position.

An actuation force (described below) applied to the slide 70 can overcome the spring force and move the slide 70 toward the stop 50 until it is located at a desired position or until it is engaged with the stop 50 in a fully open position. The slide 70 includes an angled sealing surface 80 configured to engage in a sealing manner with the base mount when the PACV 10 is closed. A cylinder 82 extends from the sealing surface 80 of the slide 70. The cylinder 82 includes a plurality of flow channels 84 to permit a fluid to flow there through when the PACV 10 is open.

Figure 2:
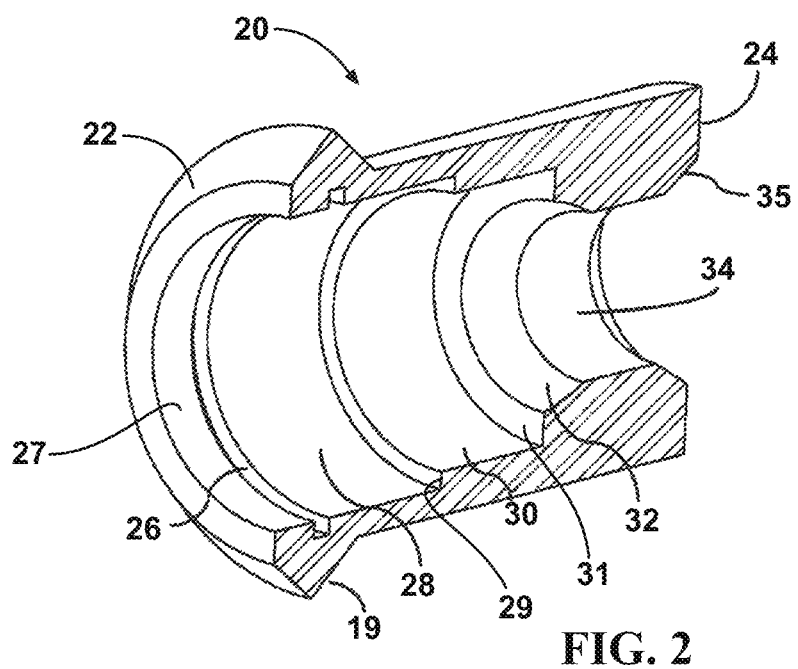
FIG. 2 is a perspective cut away view of a base mount for the PACV assembly of FIG. 1.

Referring to FIG. 2, a cutaway perspective view of the base mount 20 is shown with the valve components removed for clarity. The base mount 20 extends from a first end 22 to a second end 24. A clip groove 26 is formed around an inner perimeter wall 27 proximate the first end 22 of the base mount 20. The inner perimeter wall 27 extends between the first end 22 and the second end 24 of the base mount. The inner perimeter wall 27 includes various bores and other features that are described in more detail below. The clip groove 26 is sized to receive the retaining clip 40 to hold the stop 50 in place. A stop bore 28 is formed on the inner perimeter wall 27 adjacent the clip groove 26 proximate the first end 22 of the base mount 20. The stop bore 28 is sized to hold the stop 50 between the clip 40 and a stop abutment wall 29 protruding radially inward from the surface of the bore 28 at a distal end thereof.

A slide bore 30 is formed between the stop abutment wall 29 and a slide abutment wall 31 protruding radially inward therefrom. The slide bore 30 is sized such that the slide 70 can slidingly move therein between the stop 50 and the slide abutment wall 31. A slide seat 32 is formed by an angled surface extending from the slide abutment wall 31. Fluid flow though the PACV 10 is prevented when the sealing surface 80 of the slide 70 contacts the slide seat 32 due to the force of the spring 89. In some forms the fluid flow will assist the closing force if the closing direction is in the direction of the fluid flow pressure. A slide tip bore 34 is formed adjacent the seat 32 in the inner perimeter wall 27 proximate the second end 24 of the base mount 20. The slide tip bore 34 provides a guide for the cylinder 82 of the slide 70 to slidingly translate between an open and a closed position. In some embodiments, a tapered wall 35 can be formed on the inner perimeter wall 27 at the second end 24 of the base mount 20 to facilitate assembly and operation of slide 70.

Figure 3:
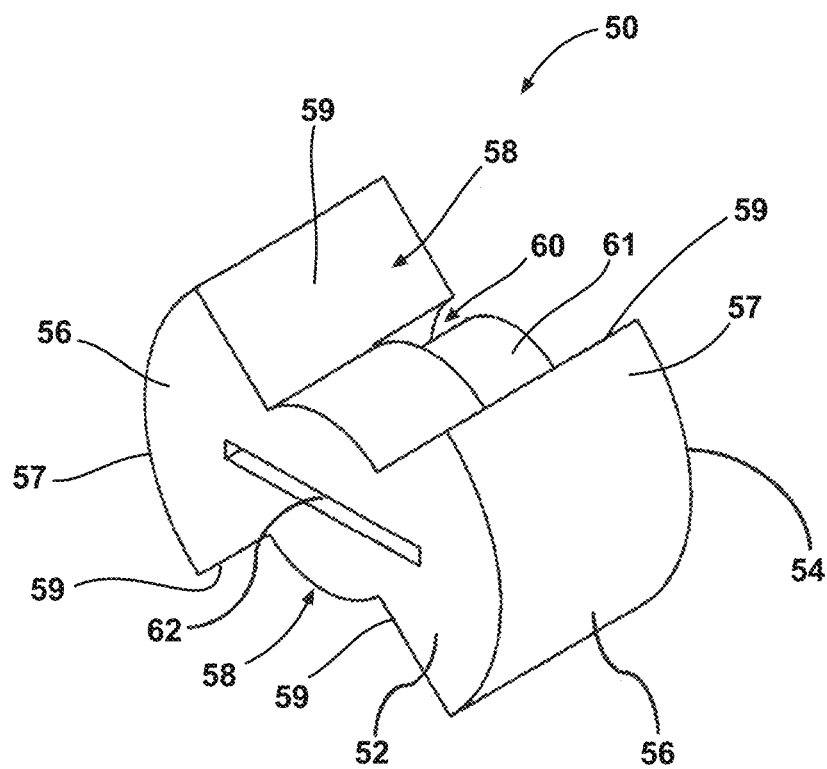
FIG. 3 is a perspective view of a stop for the PACV assembly of FIG. 1.

Referring now to FIG. 3, a perspective view of the stop 50 is illustrated. The stop is configured to provide an abutment for the slide 70 as it is moved to a fully open position. The stop 50 is defined by a first end 52 and an opposing second end 54. A pair of ears 56 extend to an outer cylindrical surface 57 that engages the stop bore 28 of the base mount 20. A flow path 58 is formed between the ears 56 on opposing sides of the stop 50 such that fluid can flow there through when the slide 70 opens. Inner walls 59 formed on the ears 56 define the boundary of the flow paths 58 on either side of the stop 50. A spring groove 60 is formed between the ears 56 and a spring hub 61 to permit the spring 89 to engage therein. A tool slot 62 can be formed in the first end 52 of the stop 50 to receive a tool such as a screwdriver or the like to facilitate assembly and angular orientation within the base mount 20. In some forms the stop 50 may have threads (not shown) to engage with the base mount 20.

Figure 4:
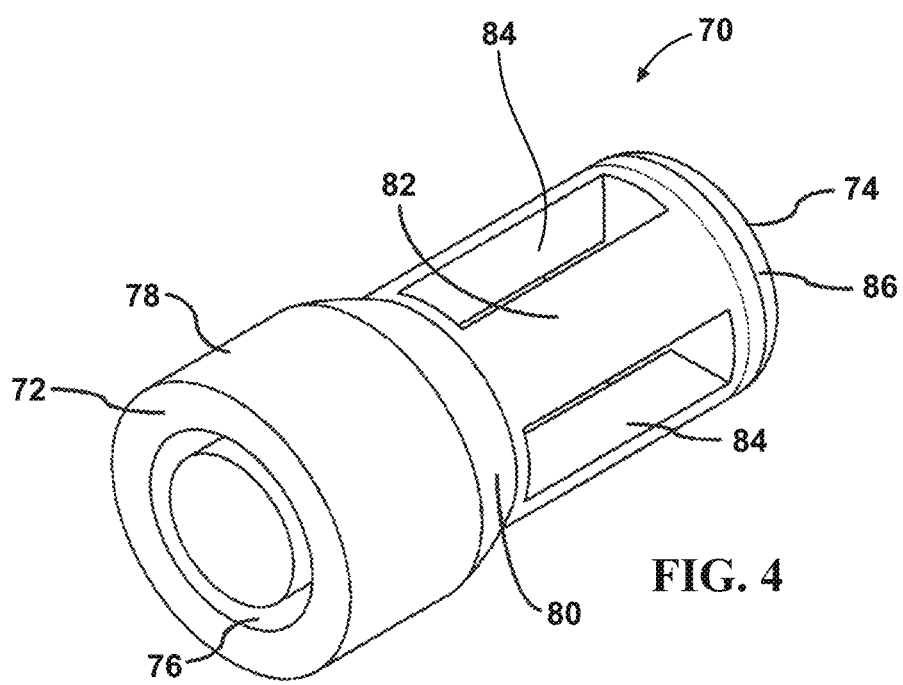
FIG. 4 a perspective view of a slide for the PACV assembly of FIG. 1.

Referring now to FIG. 4, a perspective view of a slide 70 is depicted. The slide extends from a first end 72 to an opposing second end 74. At the first end 72 of the slide 70, a spring groove 76 is configured to receive one end of the spring 89 and receive a compression force that urges the slide 70 away from the stop 50 toward the closed position. An outer bearing wall 78 is sized to fit within the slide bore 30 of the base mount 20. The outer bearing wall 78 provides a bearing surface as the slide 70 moves back and forth between an open and a closed position. A sealing surface 80 is defined by an inwardly tapered wall extending from the outer bearing wall 78. The sealing surface 80 blocks fluid flow through the PACV 10 when contacting the seat 32 of the base mount 20 in a normally closed position. A cylinder 82 extends from the sealing surface 80 to a tip 86 at the second end 74 of the slide 70. A plurality of flow channels 84 are formed through the cylinder 82 to permit a fluid flow therethrough when the slide is in an open position. In the disclosed embodiment, the flow channels 84 are substantially rectangular, however in alternate embodiments other shapes of flow channels may be formed in the slide 70.

Figure 5:
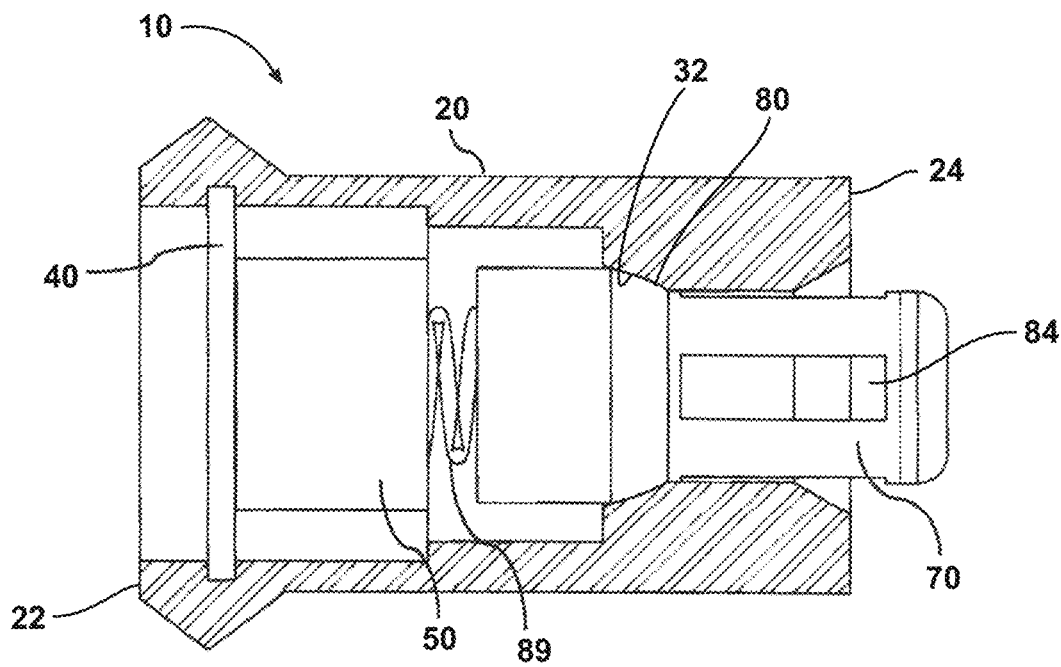
FIG. 5 is a side cutaway view of the PACV assembly of FIG. 1.

Referring now to FIG. 5, a cross sectional view of the PACV 10 is shown with the slide 70 in a closed position. The sealing surface 80 of the slide 70 is engaged with the seat 32 of the base mount 20 to prevent fluid from flowing from the flow channels 84 in the slide 70 to the first end 22 of the PACV 10.

Figure 6:
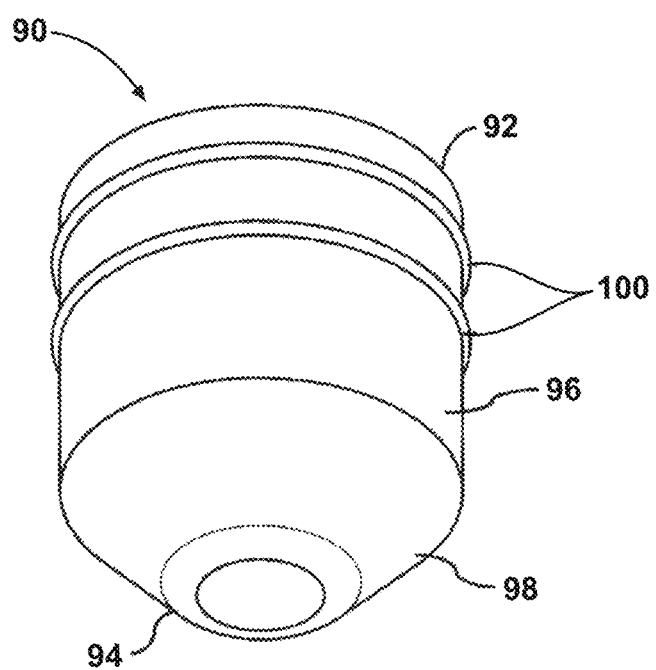
FIG. 6 is a perspective view of a piston.

Referring to FIG. 6, a perspective view of an actuator piston 90 according to one embodiment of the present disclosure is illustrated. The piston 90 extends from a first end 92 to a second end 94. A cylindrical piston body 96 forms a portion of the piston 90 at the first end 92 thereof. An actuation surface 98 is defined by a wall tapering radially inward from the piston body 96 to the second end 94. The actuation surface 98 will engage the tip 86 of the slide 70 to force the slide 70 open against the spring force 90 when the piston 90 is actuated as will be described below. The piston 90 includes at least one piston seal ring 100 and in the exemplary embodiment includes two piston seal rings 100. The piston seal rings 100 form a fluid tight seal between the piston body 96 and a housing to be described below.

Figure 7:
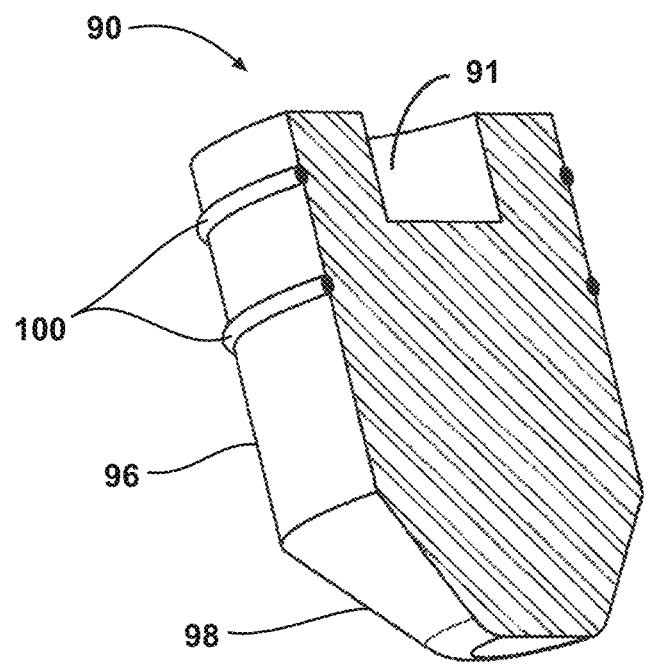
FIG. 7 is a cut away perspective view of the piston of FIG. 6.

FIG. 7 is a cross sectional cutaway of the piston 90. This view shows a connection slot 91 that is configured to receive either a mechanical actuator arm or a pressurized hydraulic fluid to cause the piston to move downward and open a slide 70.

Figure 8:
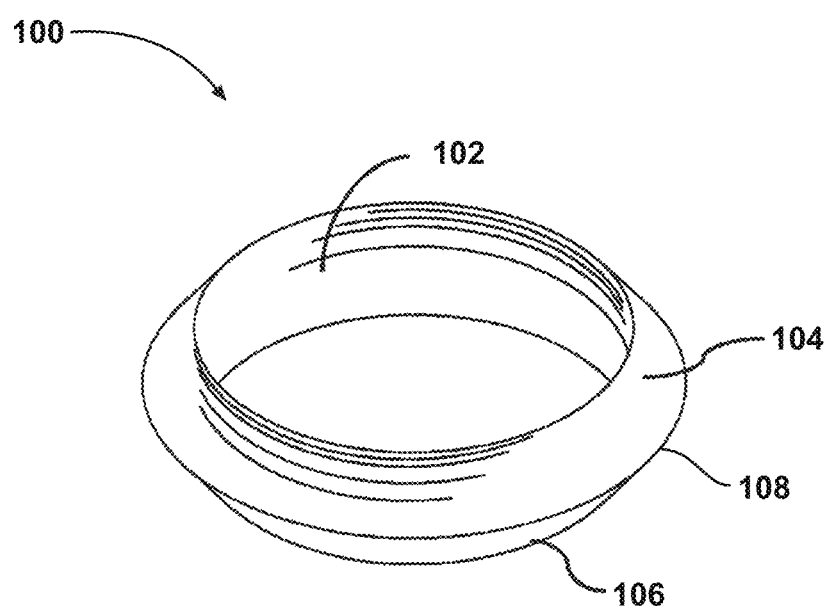
FIG. 8. is a perspective view of a piston seal.

FIG. 8 is a perspective view of a piston seal 100. The seal 100 is defined by an inner wall 102 extending between a first end 104 and a second end 106. A seal lip 108 protrudes radially outward between the first and second ends 104, 106. The seal lip 108 will engage an outer bore of the piston cylinder to form a fluid tight seal therebetween.

Figure 9:
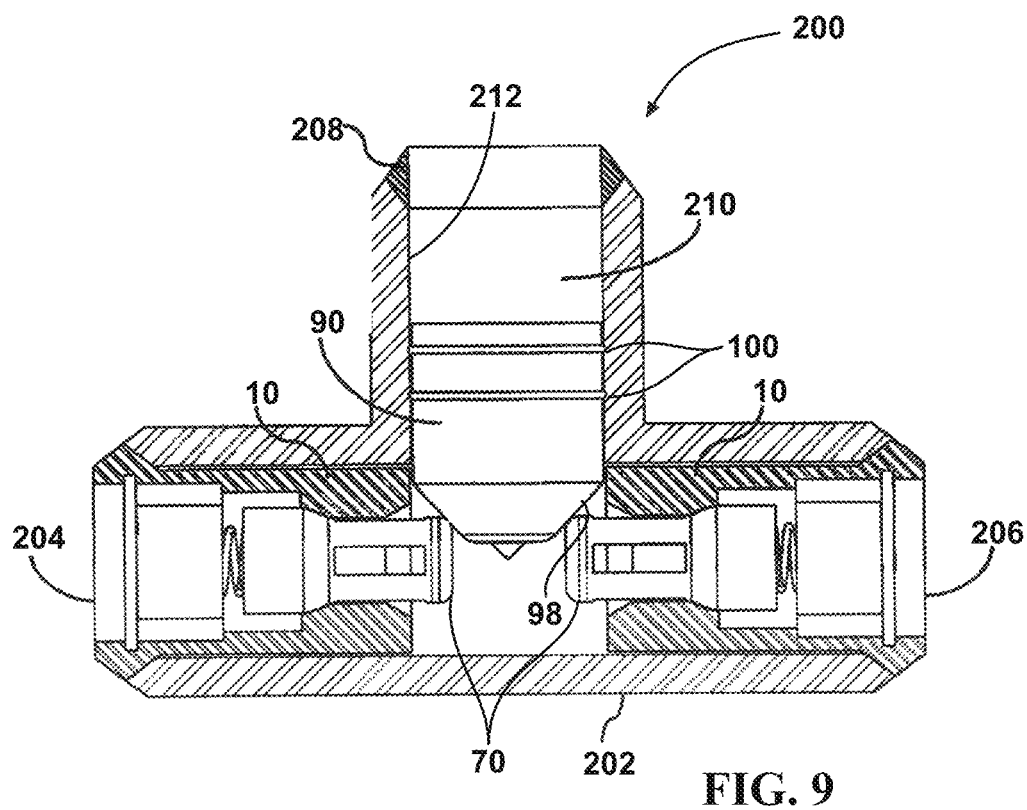
FIG. 9 is cut away view of a PACV Tee assembly in a closed position.
Figure 10:
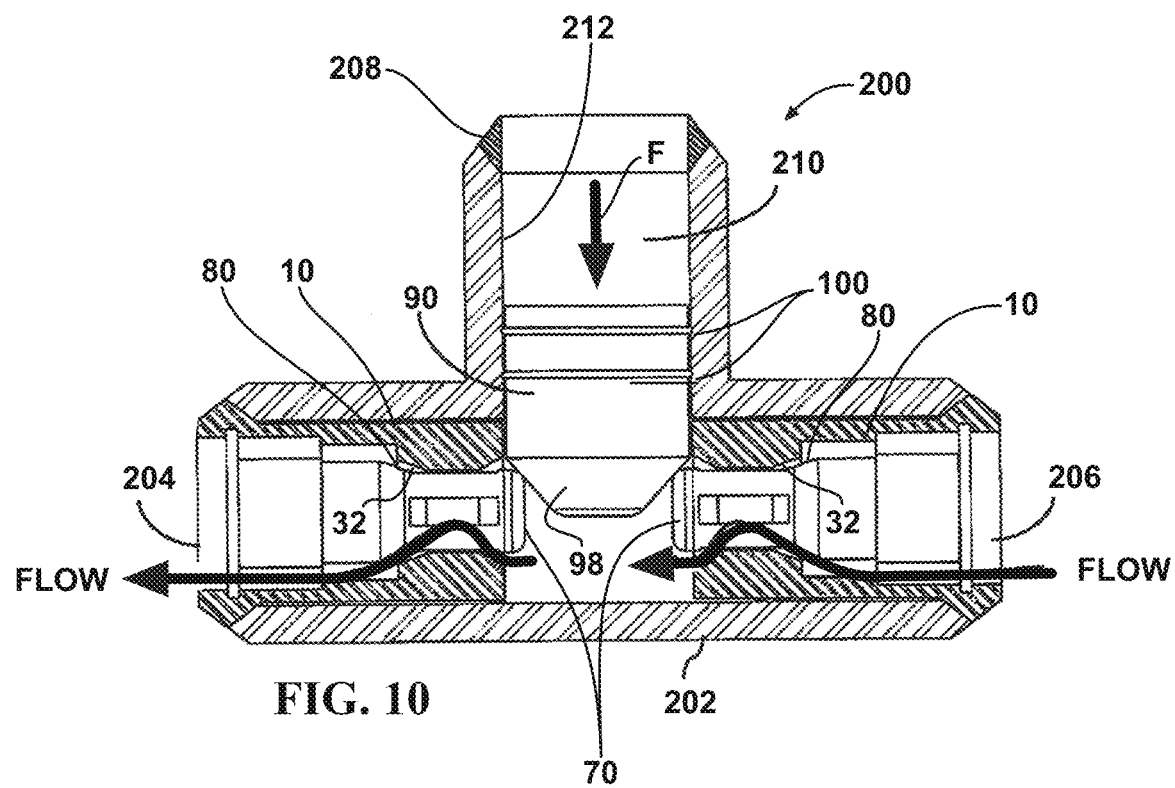
FIG. 10 is cut away view of a PACV Tee assembly in an open position.
Figure 11:
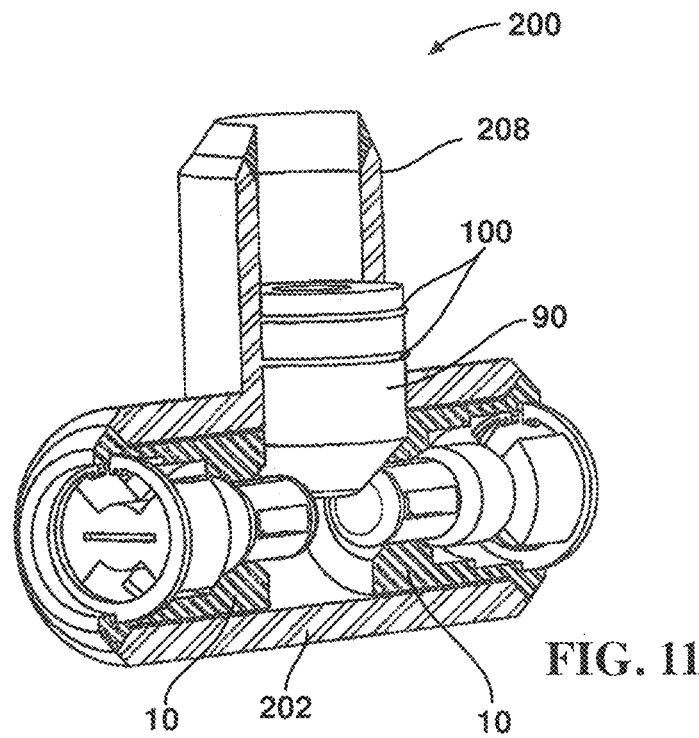
FIG. 11 is perspective cut away view of the PACV Tee assembly of FIG. 9.

Referring now to FIGS. 9 and 10, a cross sectional view of a PACV Tee assembly 200 is shown in a closed condition and an open condition, respectively. The PACV Tee assembly 200 includes a valve body 202 configured to house a pair of PACV assemblies 10 at first and second connection ends 204, 206 respectively. An actuation piston 90 is positioned in an actuator end 208 of the PACV Tee assembly 200. The actuator end 208 includes an actuator volume 210 defined by an actuator bore 212. The actuator piston 90 slides back and forth within the actuator bore 212 to engage with the slides 70 and control operation of the PACV assemblies 10. As the piston 90 is forced downward via an actuation force F, the actuation surface 98 will force the slides 70 outward to open a space between the seat 32 of the base mount 20 and the sealing surface 80 of the slide 70. In the open position, fluid can flow from the second end 206 to the first end 204 of the tee fitting 200 as illustrated in FIG. 10. FIG. 11 is another view of the PACV tee assembly 200 in a perspective cutaway view.

Figure 12:
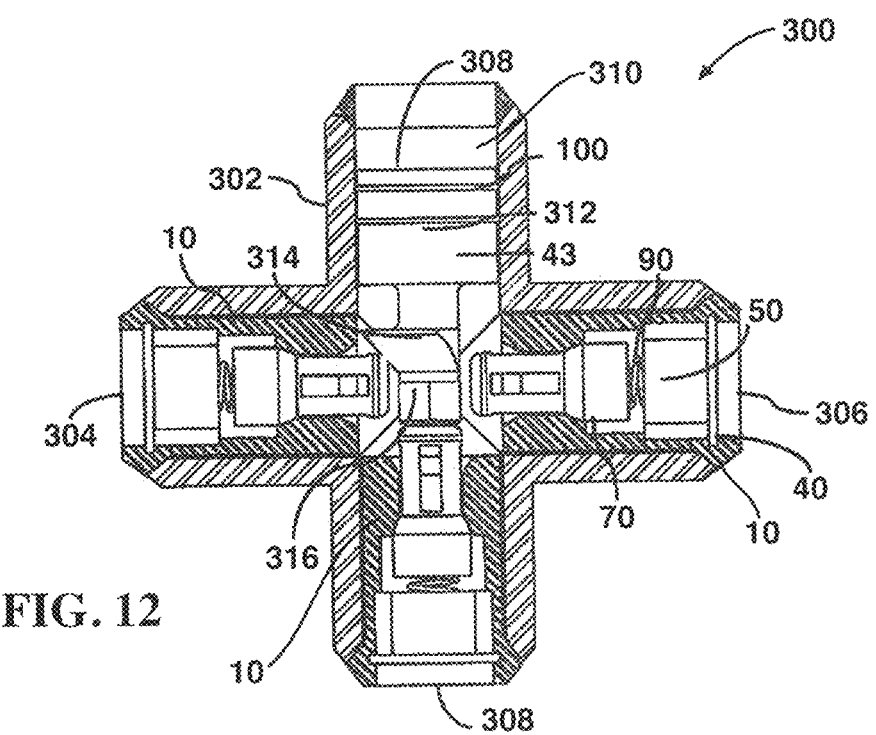
FIG. 12 is a cut away view of a PACV Cross assembly in a closed position.

Referring now to FIG. 12, a PACV cross assembly 300 is illustrated in a closed position (i.e. fluid flow is shut off). The PACV cross assembly 300 includes a valve body 302 with a first fluid connection end 304 and a second fluid connection end 306 on the opposite side thereof. A third fluid connection end 308 extends downward and an actuator connection end 310 extends upward between the first and second ends 304, 306. It should be understood that the terms up, down, left, right or other similar directional descriptors are related to the views shown in the figures of the tee and cross assemblies and do not define absolute directions in any other sense. An actuator piston 312 is located in the actuator end 310 and is operable to engage with the slides 70 located in the first 304, second 306 and/or the third 308 connection ends. The piston 312 can be rotated and moved up and down to actuate the slides 70.

Figure 13:
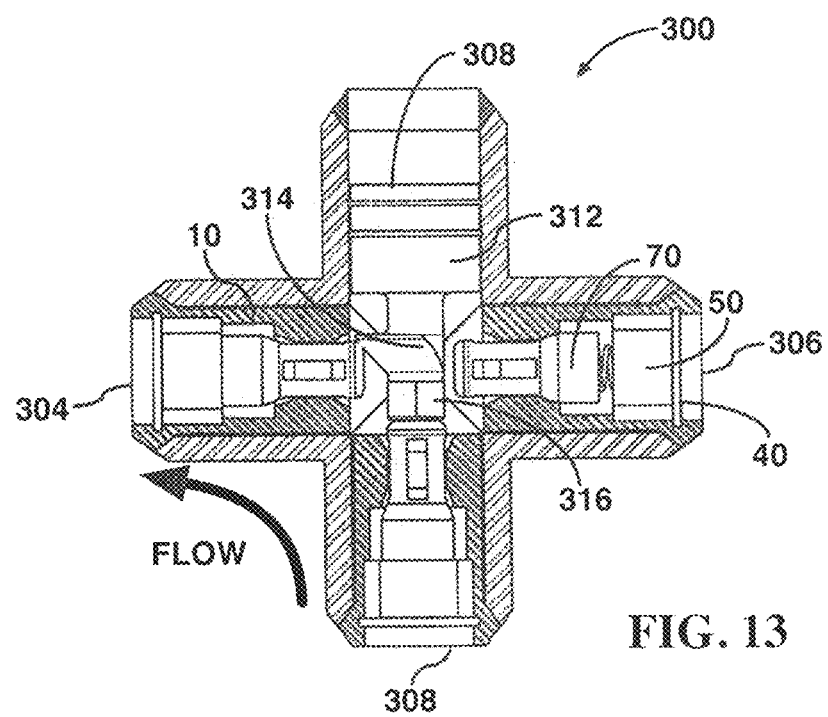
FIG. 13 is a cut away view of a PACV Cross assembly of FIG. 12 in a first open position.
Figure 14:
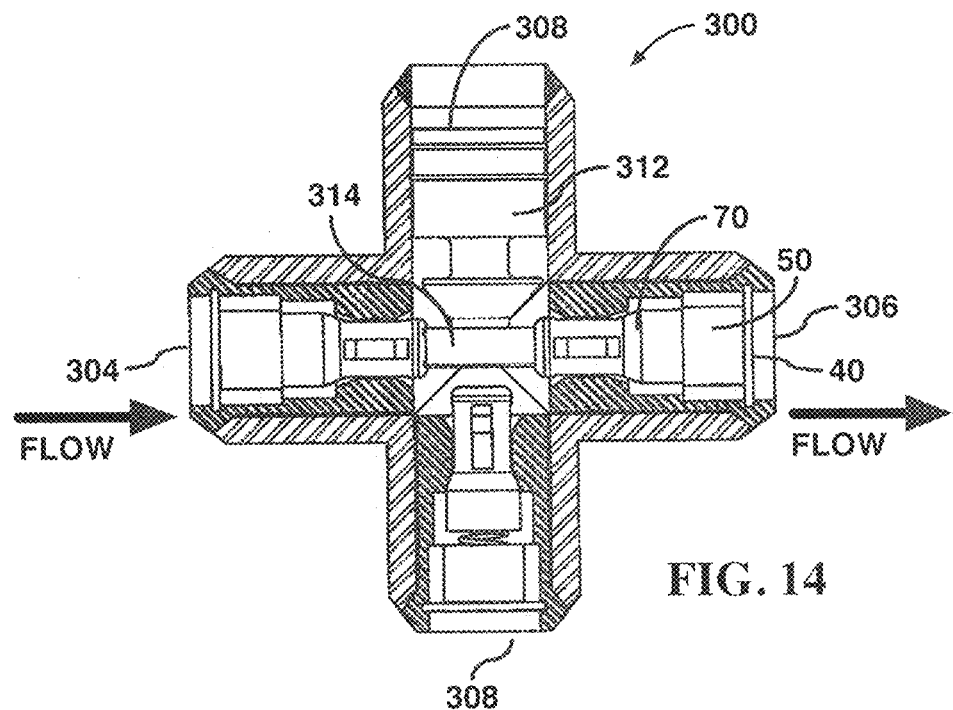
FIG. 14 is a cut away view of a PACV Cross assembly of FIG. 12 in a second open position.

FIG. 13 shows a PACV cross assembly 300 wherein the slides 70 in the first fluid connection 304 and the third fluid connection 308 are open thereby permitting a fluid flow from the third fluid connection 308 to the first fluid connection 304 as illustrated by the annotated arrow. FIG. 14 shows a PACV cross assembly 300 wherein the slides 70 in the first fluid connection 304 and in the second fluid connection 306 are open thereby permitting a fluid flow from the first fluid connection 304 to the second fluid connection 306 as illustrated by the arrows depicted therein. Note that the flow direction may be reversed depending on the pressure differential across the cross fitting 300.

Figure 15:
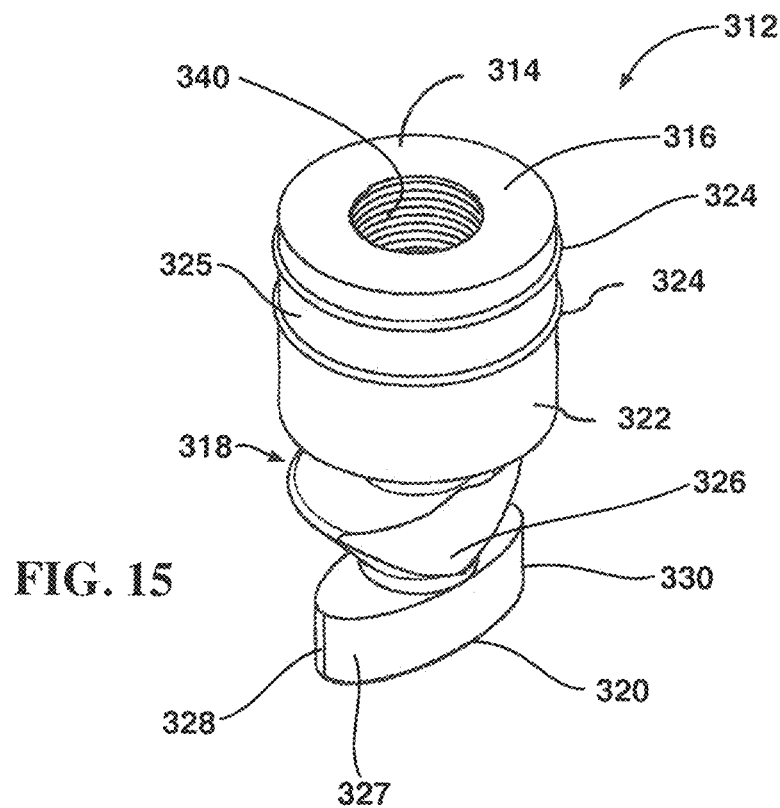
FIG. 15. is a perspective view of a piston for the PACV Cross assembly of FIG. 12.

FIG. 15 is a perspective view of the actuator piston 312 that operates in a PACV cross assembly 300. The actuator piston 312 incudes a piston head 314 formed at a first end 316. An actuator arm 318 extends from the piston head 314 to a second end 320 of the piston 312 in the illustrative embodiment. In some forms the actuator arm 318 is substantially frustoconical in shape and the second end 320 is ellipsoidal. The piston head 314 includes a cylindrical piston body 322 with one or more seals 324 positioned around the perimeter wall 325 thereof. The actuator arm 318 includes an actuator lip 326 that projects radially outward therefrom. The actuator lip 326 can be rotated to actuate the slides 70 positioned in the first and/or second fluid connection ends 304, 306 of the PACV cross assembly 300. An actuator wedge or cam 327 formed in an oval or elliptical shape includes a first edge 328 and a second edge 330 projecting from opposing ends thereof. The actuator cam 327 can open the slide 70 in the third fluid connection 308 of the PACV cross assembly 300. When the piston is forced downward, the actuator cam 327 will engage the tip of the slide 70 and force it downward to open the valve at the third connection 308 of the cross assembly 300. A piston head connecting feature 340 can include threads or other mechanical connection means for interfacing with a mechanical actuator (not shown). While the mechanical actuator is not shown, one skilled in the art will readily understand the operation thereof.

In operation, the actuator arm 318 works in conjunction with a cam 327 at the second end 320 to actuate slide 70 of flow paths 304, 306 and 308 depending on the rotary orientation and linear displacement or combination thereof piston 312. The actuator arm 318 is disengaged when positioned above slide 70 and when the major axis of the cam 327 is perpendicular to flow. Downward linear action of piston 312 upon slide 70 in this position will initiate flow as shown in FIG. 13. Upward linear action will disengage slide 70 and stop the flow. When piston 312 is provided with further upward linear action the cam end is elevated in the plane of horizontal flow, then piston 312 is rotated to engage slide 70 causing flow shown in FIG. 14. Reversing the motion closes the valve by disengaging the slide 70 and thus stopping the flow.

Figure 16:
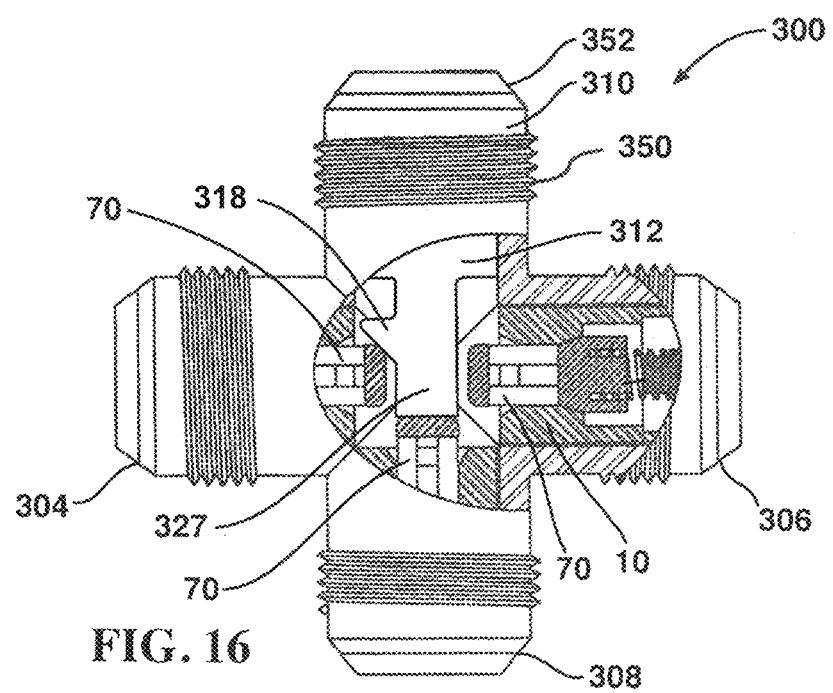
FIG. 16. is a cutaway perspective view of the PACV Cross assembly of FIG. 12.
Figure 17:
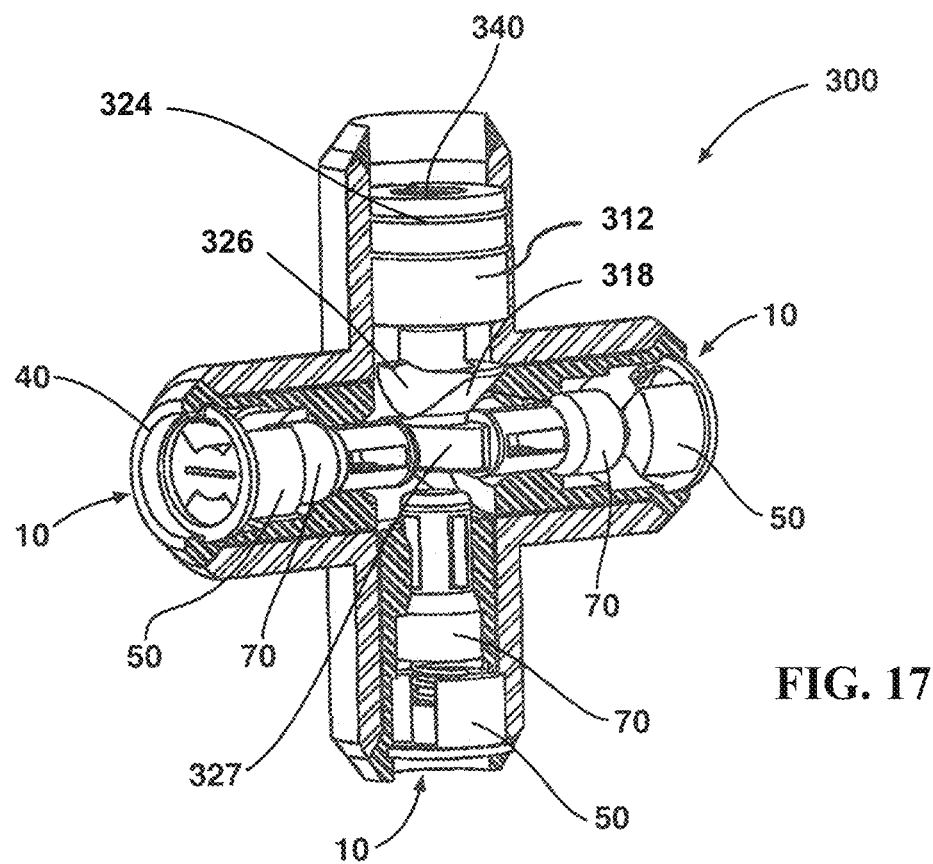
FIG. 17. is another cutaway perspective view of the PACV Cross assembly of FIG. 12.

Referring now to FIGS. 16 and 17, cutaway perspective views of the PACV cross assembly 300 shows a portion of the internal components such as the PACV assemblies 10, retaining clips, 40, stops 50, slides 70, piston 312, actuator arm 318, actuator lip 326, actuator cam 327 and piston head connecting feature 340. Each of the connecting ends 304, 306, 308 and 310 can include threaded portions 350 and an angled sealing surface 352 such as standard thirty-seven degree, forty-five degree or similar type of flare joint connection. It should be understood that the connecting ends may use other means to seal and connect with a fluid conduit. By way of example and not limitation, clamp means, welding, brazing, bolted flange and/or other mechanical means may be used as one skilled in the art would readily understand.

Figure 18:
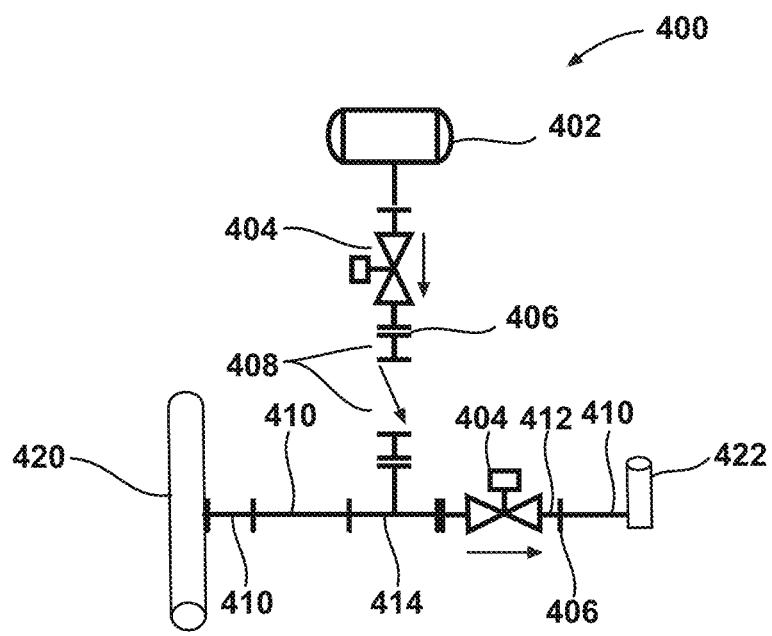
FIG. 18 is a schematic piping diagram of a conventional fluid circuit.

Referring now to FIG. 18, a schematic diagram of a conventional fluid circuit 400 is depicted. The fluid circuit 400 includes a purge source 402 with a conventional valve 404 fluidly connected thereto. A fluid joint 406 is coupled between the conventional valve 404 and a check valve 408. A tube 410 extends in opposing directions from a tee fitting 414 to connect with a main fluid circuit 420 and a discharge line 422, respectively. Another conventional valve 404 with a fitting 412 and a joint 406 is fluidly connected in the tube 410 upstream of the discharge line 422.

Figure 19:
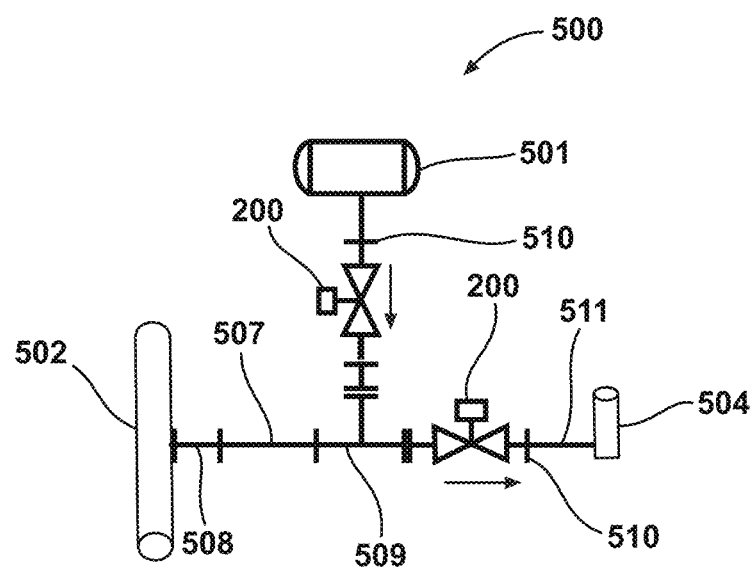
FIG. 19 is a schematic piping diagram of a fluid circuit with a PACV tee according to one embodiment of the present disclosure.
Figure 20:
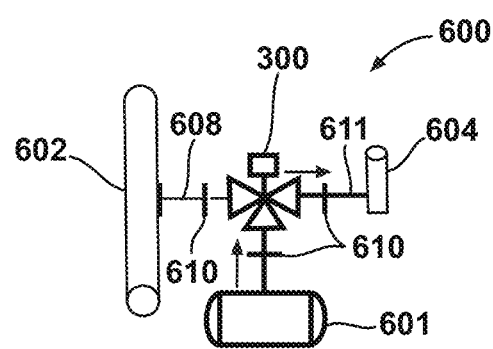
FIG. 20 is a schematic piping diagram of a fluid circuit with a PACV cross assembly according to one embodiment of the present disclosure.

FIG. 19 a schematic diagram of a novel fluid circuit 500 similar to the fluid circuit 400 including a purge source 501, main fluid circuit 502, discharge line 504, and conduits 507 and 511. However, the novel fluid circuit 500 includes a PACV tee assembly 200 that replaces the check valves and conventional valves and associated connecting joints. Each of the PACV tee assemblies 200 include an a union fitting 508, a tee fitting 509 and an integral joint 510 that connects the PACV tee assemblies 200 to conduits within fluid circuit 500. FIG. 20 is schematic diagram of a novel fluid circuit 600 with purge source 601, main fluid circuit 602, discharge line 604, and conduits 608 and 611. However, a PACV cross assembly 600 replaces the check valves, conventional valves and connecting joints. Integral joints 610 connect the PACV 600 to conduits in the circuit 600.

Figure 21:
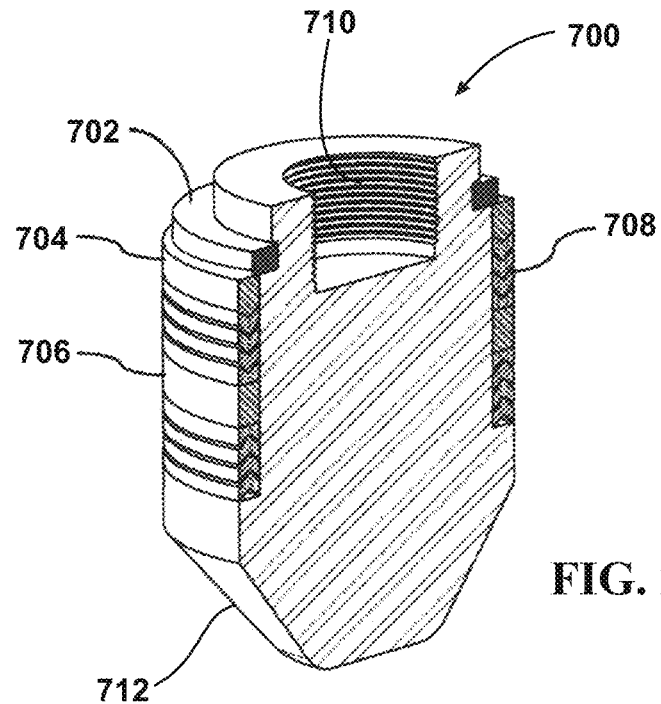
FIG. 21 is a cross sectional perspective view of a piston according to another embodiment of the present disclosure.

FIG. 21 is a cross sectional view of a piston 700 according to another embodiment of the present disclosure. The piston 700 includes a clip 702 configured to lock seals 708 in position around the piston 700. A ring 704 and a spacer 706 are positioned between the seals 708 and the clip 702 to provide a desired axial location of the seals 708 with respect to the piston 700. An actuation surface 712 is formed at one end of the piston 700 to engage and move a slide valve to an open position. A connecting feature 710 that may include interface threads or the like for an actuation member (not shown) to connect to the piston 700.

Figure 22:
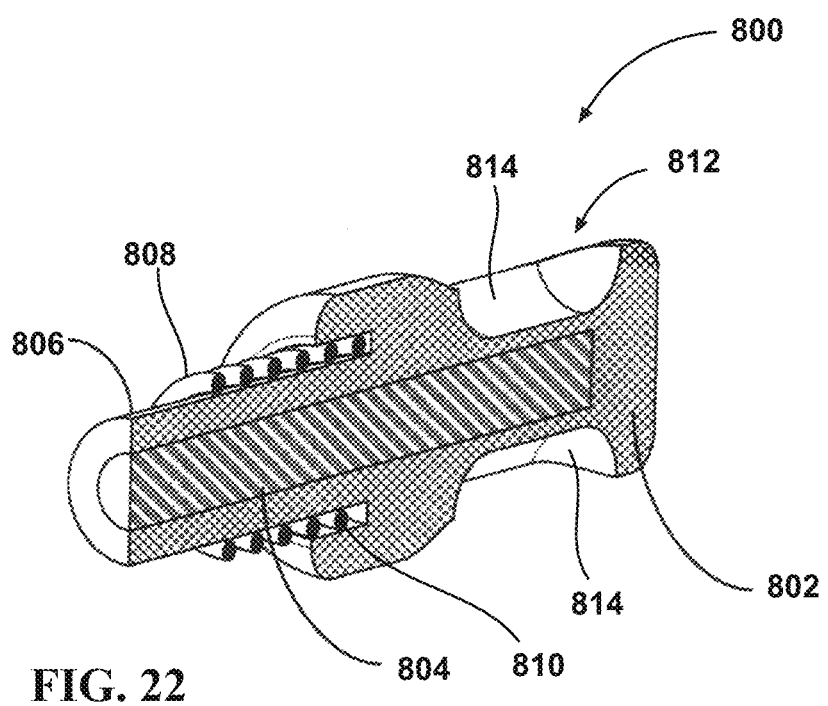
FIG. 22 is a cross sectional perspective view of a slide according to another embodiment of the present disclosure.

FIG. 22 depicts a slide 800 in an alternate embodiment that is configured to work in conjunction with the piston 700. The slide 800 includes a body 802 that may be formed of a composite material in some forms to provide a lighter and/or a wear resistant slide. A stiffening member 804 may be positioned within the body 802 to strengthen the slide 800. The stiffening member 804 may be formed from a metal, a metal alloy, a composite, a ceramic or other similar materials as would be known to one skilled in the art. The body 802 includes an extended tail 806 constructed to permit a spring 808 to engage around a perimeter thereof. A spring groove 810 is formed between the tail 806 and an outer portion of the body 802. The spring 808 slides around the extended tail 806 and into the spring groove 810. A cylinder 812 includes flow channels 814 formed therein to permit a fluid flow therethrough when the slide is moved to an open position similar to the previous embodiments discussed above.

Figure 23:
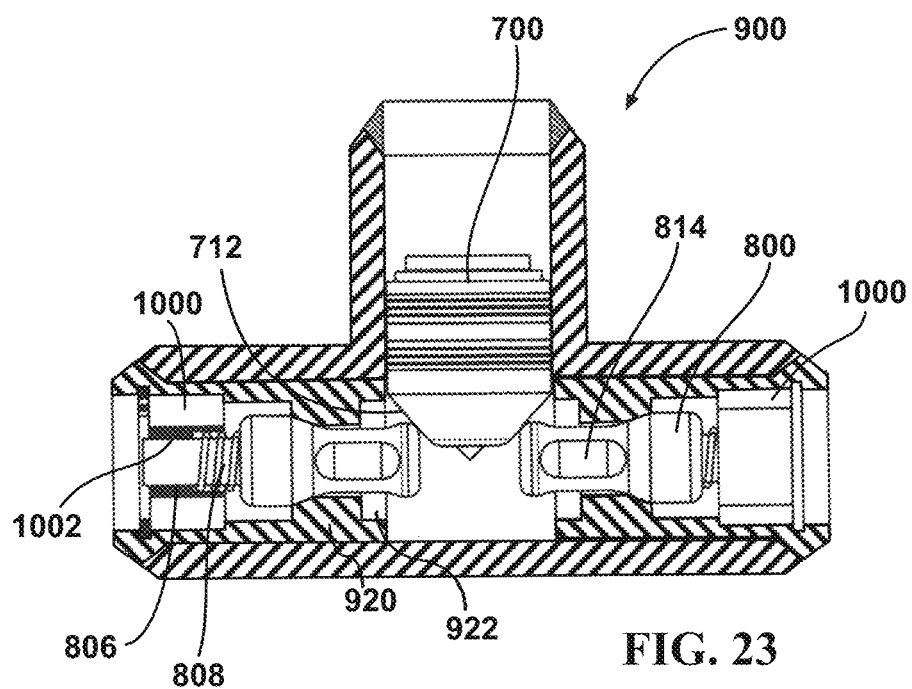
FIG. 23 is a cross sectional side view of a PACV Tee assembly according to another embodiment of the present disclosure.
Figure 24:
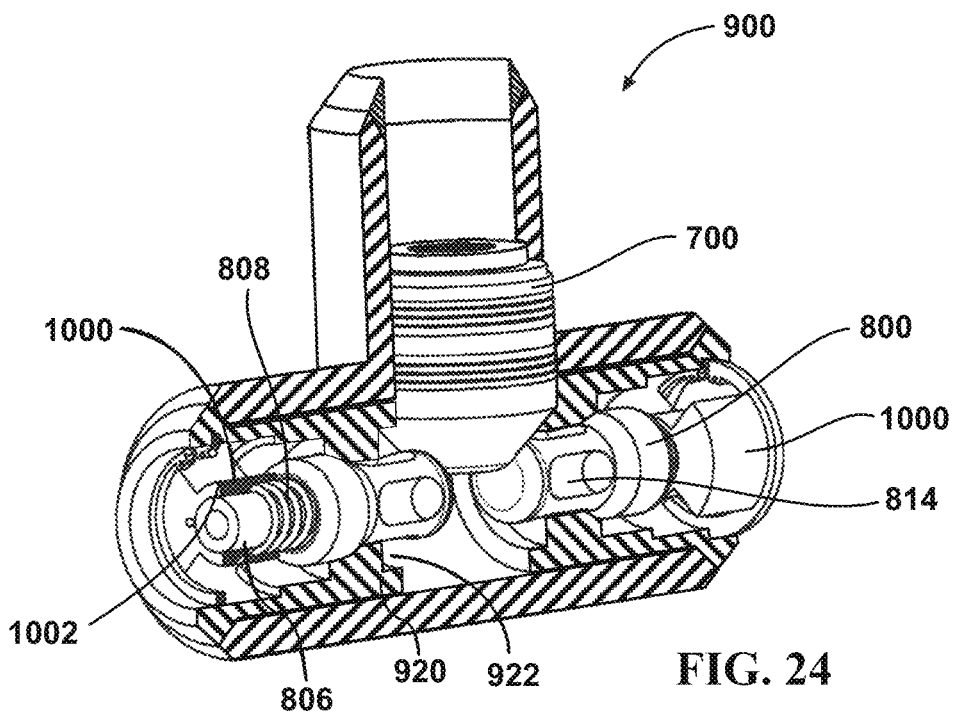
FIG. 24 is a cross sectional perspective view of the PACV Tee assembly of FIG. 23.

Referring now to FIGS. 23 and 24, cross-sectional cutaway views of a PACV tee assembly 900 according to another embodiment is shown. The PACV tee assembly 900 operates substantially similarly to previous embodiments described above however, the alternate piston 700 and alternate slide 800 is assembled therewith. A stop 1000 operates substantially similar to the stop 50, however the design is modified to include an internal bore 1002 formed therein to receive insertion of the extended tail 806 and the spring 808 of the slide 800.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A piston actuated cartridge valve comprising:
   a base mount extending between first and second ends;
   a stop positioned in a fixed location within a stop bore formed within the base mount proximate the first end;
   a slide positioned within a slide bore formed within the base mount adjacent the stop bore;
   wherein the slide is movable between a closed position and a fully open position; and
   wherein the fully open position of the slide is defined by moving the slide toward the stop until contact with the stop;
   wherein the slide incudes:
   a bearing wall slidingly engaged with the slide bore of the base mount;
   a sealing surface formed by a tapered wall extending radially inward from the bearing wall;
   a cylinder extending from the sealing surface to a cylinder tip; and
   a plurality of flow channels formed through a cylindrical wall of the cylinder configured to permit fluid to pass into the cylinder and back out of the cylinder when the slide is opened;
   wherein the base mount is insertable into a piston actuated cartridge valve assembly body.

2. The piston actuated cartridge valve of claim 1, further comprising a resilient member positioned between the slide and the stop.

3. The piston actuated cartridge valve of claim 2, wherein the resilient member urges the slide toward the closed position.

4. The piston actuated cartridge valve of claim 1, further comprising an actuator piston configured to engage the cylinder tip and urge the slide to move toward the fully open position.

5. The piston actuated cartridge valve of claim 4, further comprising a fluid fitting having the base mount, stop, slide and piston housed therein.

6. The piston actuated cartridge valve of claim 5, wherein the fluid fitting is one of a tee or a cross assembly.

7. The piston actuated cartridge valve of claim 4, wherein the actuator piston is operable for opening one, two or three separate slides.

8. A fluid fitting comprising:
   a plurality of passageways extending radially outward in different directions from a central location;
   wherein at least two of the passageways include connecting ends formed at a distal end thereof to couple with fluid conduit pipes in a fluid system;
   a piston actuated cartridge valve (PACV) positioned extending from the distal end to a proximal end within each of the at least two passageways;
   a piston positioned in another of the passageways of the fitting operable for opening each of the PACVs; and
   wherein the PACVs cooperate together within the passageways of the fitting to selectively direct fluid in one of a plurality of directions through the passageways of the fitting.

9. The fluid fitting of claim 8, wherein the PACV comprises:
   a base mount having a stop bore and a slide bore formed internally thereto;
   a stop positioned within the stop bore;
   a slide positioned within the slide bore; and
   a resilient member positioned between the stop and the slide.

10. The fluid fitting of claim 9, wherein the slide is moveable between an open and a closed position.

11. The fluid fitting of claim 10, wherein the piston engages and moves the slide to the open position.

12. The fluid fitting of claim 11, wherein the spring engages and urges the slide toward the closed position.

13. The fluid fitting of claim 8, wherein the fitting is one of a tee or cross assembly.

14. A valve system comprising:
   a fitting having a plurality of passageways;

a piston actuated cartridge valve (PACV) positioned in at least two of the passageways; and an actuation piston having a first end and a second end positioned in one of the passageways operable to control fluid flow through each of the PACVs;

a slide valve movable between an open and a closed position within the PACV, the slide valve including a cylinder with a plurality of flow channels formed therethrough to permit fluid to into or out of the cylinder when the slide valve is open; and a stop positioned within the PACV to restrict travel of the slide valve, the stop being stationary and having external flow paths formed on opposing sides to permit fluid to flow past the stop and through the fitting when the slide valve is open.

15. The valve system of claim 14, further comprising an actuation force acting on the first end of the actuation piston to move the second end of the piston into contact with the slide valve.

16. The valve system of claim 14, wherein the stop includes a pair of ears having flat inner walls extending from an outer cylinder wall inward to a spring hub, the ears extending at opposing sides with a flow path formed therebetween to form a boundary for the external flow paths.

17. The valve system of claim 14, wherein the fitting is one of a tee and a cross assembly.

18. The valve system of claim 14, wherein the valve system operates as both a flow valve and a check valve.

* * * * *